US012786646B2

(12) United States Patent
Li et al.

(10) Patent No.: US 12,786,646 B2
(45) Date of Patent: Nov. 3, 2026

(54) ACOUSTIC TESTING DEVICE, FIXTURE STRUCTURE, TESTING BOARD AND ACOUSTIC TESTING METHOD

(71) Applicant: XMEMS TAIWAN CO., LTD., Hsinchu County (TW)

(72) Inventors: Wei-Yang Li, Hsinchu County (TW); Hai-Hung Wen, Hsinchu County (TW)

(73) Assignee: XMEMS TAIWAN CO., LTD., Hsinchu County (TW)

( * ) Notice: Subject to any disclaimer, the term of this patent is extended or adjusted under 35 U.S.C. 154(b) by 177 days.

(21) Appl. No.: 18/731,376

(22) Filed: Jun. 3, 2024

(65) Prior Publication Data

US 2025/0175752 A1 May 29, 2025

Related U.S. Application Data

(60) Provisional application No. 63/602,451, filed on Nov. 24, 2023.

(51) Int. Cl.
*H04R 29/00* (2006.01)
*G01K 1/14* (2021.01)
*G01L 19/00* (2006.01)

(52) U.S. Cl.
CPC ............. *H04R 29/001* (2013.01); *G01K 1/14* (2013.01); *G01L 19/0092* (2013.01); *H04R 2201/003* (2013.01)

(58) Field of Classification Search
CPC ................ H04R 29/001; H04R 29/004; H04R 2201/003; G01L 19/0092; G01K 19/0092; B81C 99/0035; B81C 99/004; B81C 99/0045; G01R 31/2881; G01R 31/2872; G01R 31/2874
See application file for complete search history.

(56) References Cited

U.S. PATENT DOCUMENTS

| | | | | |
|---|---|---|---|---|
| 11,368,804 B1 * | 6/2022 | Liu | ...................... | H04R 19/005 |
| 11,395,081 B2 * | 7/2022 | Lo | ........................ | H04R 29/001 |
| 11,536,760 B2 * | 12/2022 | Huang | ............... | G01R 31/3025 |
| 2015/0321906 A1 * | 11/2015 | Tsai | .......................... | B81B 7/02 438/51 |
| 2021/0377682 A1 * | 12/2021 | Rusconi Clerici Beltrami | .......... | H04R 29/005 |
| 2022/0365131 A1 * | 11/2022 | Fritsch | ................. | B81C 99/004 |

* cited by examiner

*Primary Examiner* — Jason R Kurr
(74) *Attorney, Agent, or Firm* — Winston Hsu

(57) ABSTRACT

An acoustic testing device includes a substrate, an acoustic component, a fixture component and an acoustic sensing component. The substrate has a first and a second surfaces and a substrate opening. The acoustic component has a first side and a second side and is disposed on the first surface of the substrate and corresponding to the substrate opening. The acoustic sensing component is fixed by a fixture component. The substrate is between the acoustic component and the fixture component, and the acoustic component is connected to the first cavity through the substrate opening. The first side of the acoustic component faces a second cavity and experiences a testing condition maintained within the second cavity. The acoustic sensing component senses an acoustic wave radiated from the second side of the acoustic component via the substrate opening while the first side of the acoustic component experiences the testing condition.

21 Claims, 4 Drawing Sheets

ACOUSTIC TESTING DEVICE, FIXTURE STRUCTURE, TESTING BOARD AND ACOUSTIC TESTING METHOD

CROSS REFERENCE TO RELATED APPLICATIONS

This application claims the benefit of U.S. Provisional Application No. 63/602,451, filed on Nov. 24, 2023. The content of the application is incorporated herein by reference.

BACKGROUND OF THE INVENTION

1. Field of the Invention

The present application relates to an acoustic testing device, a fixture structure, a testing board and an acoustic testing method, and more particularly, to an acoustic testing device capable of obtaining performances of an acoustic component in different temperatures, and to a related fixture structure, a related testing board and a related acoustic testing method.

2. Description of the Prior Art

Nowadays, acoustic devices can be widely used in various electronic devices. In order to enhance the performance of the acoustic device, an acoustic component disposed in the acoustic device needs to be tested, thereby checking the performance of the acoustic component.

Normally, the performance of the acoustic component would be changed due to a temperature change. Thus, the relation between the performance of the acoustic component and the temperature needs to be tested. However, there is no device and system that dynamically tests the relation between the performance of the acoustic component and the temperature at present. Thus, there is a requirement for a system or a device which is capable of dynamically testing this relation.

SUMMARY OF THE INVENTION

It is therefore a primary objective of the present invention to provide an acoustic testing device having specific design, so as to obtain performances of an acoustic component in different temperatures or under extreme high/low temperatures. Furthermore, a related fixture structure, a related testing board and a related acoustic testing method are provided in the present invention also.

An embodiment of the present invention provides an acoustic testing device including a substrate, an acoustic component, a fixture component and an acoustic sensing component. The substrate has a first surface and a second surface opposite to the first surface, wherein the substrate has a substrate opening. The acoustic component is disposed on the first surface of the substrate and corresponding to the substrate opening. The fixture component is disposed on the second surface of the substrate, wherein a first cavity is formed between the fixture component and the substrate. The acoustic sensing component is fixed by the fixture component. The substrate is between the acoustic component and the fixture component. A first side of the acoustic component faces a second cavity and experiences a testing condition maintained within the second cavity. The acoustic sensing component is configured to sense an acoustic wave radiated from a second side of the acoustic component via the substrate opening while the first side of the acoustic component experiences a testing condition.

Another embodiment of the present invention provides a fixture structure including a fixture component. The fixture component includes a first part and a second part. The first part includes a first inner sidewall surrounding a first space, wherein the first part has an acoustic inlet defined by the first inner sidewall and connected to the first space. The second part is connected to the first part and includes a second inner sidewall surrounding a second space connected to the first space, wherein the second space is configured to accommodate an acoustic sensing component. The fixture structure is configured to hold the acoustic sensing component.

Still another embodiment of the present invention provides a testing board including a substrate. The substrate has a first surface and a second surface opposite to the first surface, wherein the substrate has a substrate opening. An acoustic component is disposed or to be disposed on the first surface of the substrate and corresponding to the substrate opening. The second surface faces to an acoustic sensing component, and the acoustic sensing component is configured to sense an acoustic wave radiated from a first side of the acoustic component via the substrate opening while a second side of the acoustic component experiences a testing condition.

Still another embodiment of the present invention provides an acoustic testing method. The acoustic testing method includes: providing an acoustic testing device; performing a first testing process; and performing a second testing process. The acoustic testing device includes a substrate, an acoustic component, a fixture component, an acoustic sensing component and a chamber. The substrate has a first surface and a second surface opposite to the first surface, wherein the substrate has a substrate opening. The acoustic component is disposed on the first surface of the substrate and corresponding to the substrate opening. The fixture component is disposed on the second surface of the substrate, wherein a first cavity is formed between the fixture component and the substrate. The acoustic sensing component is fixed by the fixture component. A second cavity exists inside the chamber, the substrate, the acoustic component, the fixture component and the acoustic sensing component are disposed in the chamber, and the substrate is between the first cavity and the second cavity. A first side of the acoustic component faces a second cavity and experiences a testing condition maintained within the second cavity. The acoustic sensing component is configured to sense an acoustic wave radiated from a second side of the acoustic component via the substrate opening while the first side of the acoustic component experiences the testing condition. In the first testing process, the acoustic wave is sensed by the acoustic sensing component to obtain a first result after a temperature of the second cavity is adjusted to reach a first value. In the second testing process, the acoustic wave is sensed by the acoustic sensing component to obtain a second result after the temperature of the second cavity is adjusted to reach a second value different from the first value. The first testing process and the second testing process are performed iteratively.

Still another embodiment of the present invention provides an acoustic testing method. The acoustic testing method includes: providing a cavity within which a testing condition is maintained; disposing an acoustic component on a first surface of a substrate, wherein a substrate opening is formed on the substrate, a first side of the acoustic component faces the cavity and experiences the testing condition maintained within the cavity; disposing a fixture component on a second surface of the substrate, wherein an acoustic sensing component is fixed within the fixture component; and sensing, by the acoustic sensing component, an acoustic wave radiated from a second side of the acoustic component via the substrate opening.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
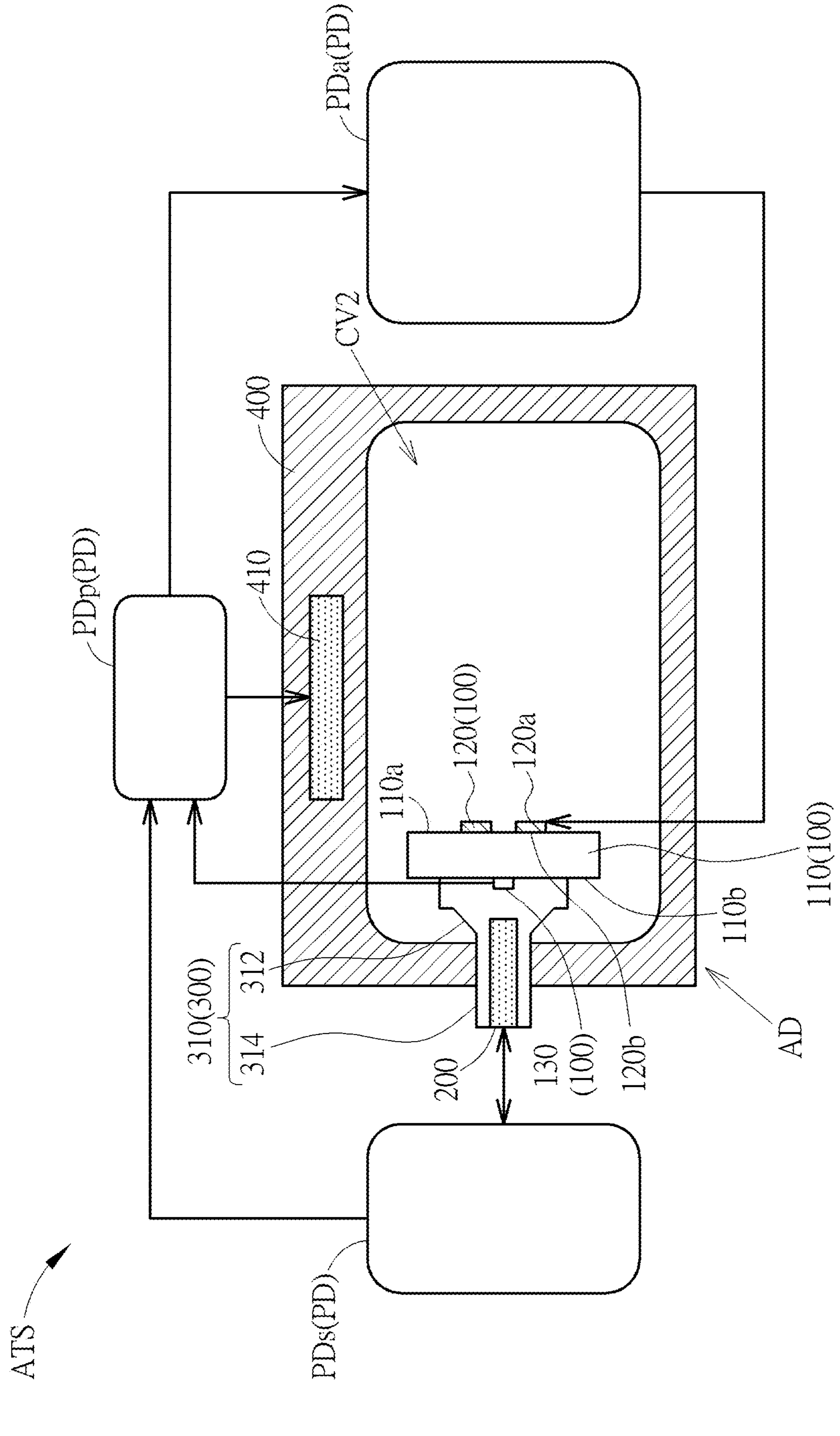
FIG. 1 is a schematic diagram illustrating an acoustic testing system with an acoustic testing device according to an embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented.

In the following description and in the claims, when "a A1 component is formed by/of B1", B1 exist in the formation of A1 component or B1 is used in the formation of A1 component, and the existence and use of one or a plurality of other features, areas, steps, operations and/or components are not excluded in the formation of A1 component.

In the following description and in the claims, the term "substantially" generally means a small deviation may exist or not exist. For instance, the terms "substantially parallel" and "substantially along" means that an angle between two components may be less than or equal to a certain degree threshold, e.g., 10 degrees, 5 degrees, 3 degrees or 1 degree. For instance, the term "substantially aligned" means that a deviation between two components may be less than or equal to a certain difference threshold, e.g., 2 μm or 1 μm. For instance, the term "substantially the same" means that a deviation is within, e.g., 10% of a given value or range, or mean within 5%, 3%, 2%, 1%, or 0.5% of a given value or range.

In the description and following claims, the term "horizontal direction" generally means a direction parallel to a horizontal plane, the term "horizontal plane" generally means a plane parallel to a direction X and a direction Y in the drawings (i.e., the direction X and the direction Y of the present invention may be considered as the horizontal directions), the term "vertical direction" and the term "top-view direction" generally mean a direction parallel to a direction Z and perpendicular to the horizontal direction in the drawings, and the direction X, the direction Y and the direction Z are perpendicular to each other. In the description and following claims, the term "top view" generally means a viewing result viewed along the vertical direction. In the description and following claims, the term "cross-sectional view" generally means a structure cutting along the vertical direction is viewed along the horizontal direction.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, an acoustic testing system is configured to test an acoustic component, so as to obtain performances of the acoustic component in different temperatures or under extreme high/low temperatures (e.g., from −40° C. to 125° C., as an embodiment). In the present invention, the acoustic component is related to an acoustic wave, such that the performance of the acoustic component is the performance of the acoustic wave.

In some embodiments, the acoustic component may include an acoustic transducer configured to perform an acoustic transformation, wherein the acoustic transformation may convert signals (e.g. electric signals) into the acoustic wave. For example, the acoustic transducer may be a sound producing component, a speaker, a micro speaker or other suitable device, so as to convert the electric signals into the acoustic wave (i.e., the acoustic transducer may generate the acoustic wave), but not limited thereto. For example, since the acoustic component may include the acoustic transducer generating the acoustic wave, the performance of the acoustic wave may be determined by the sensed sound pressure level (SPL), but not limited thereto.

Figure 2:
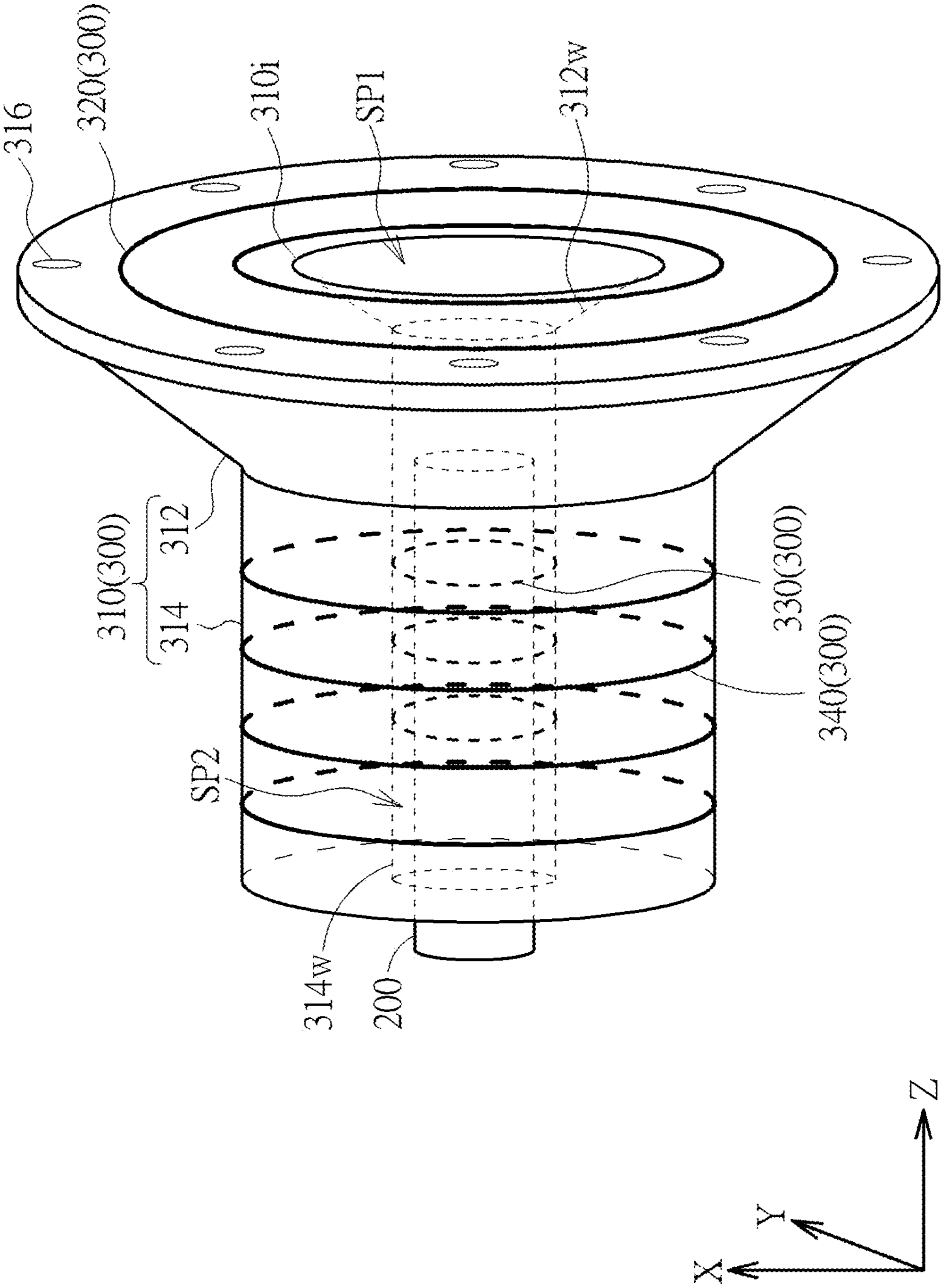
FIG. 2 is a schematic diagram illustrating a fixture structure and an acoustic sensing component according to an embodiment of the present invention.
Figure 3:
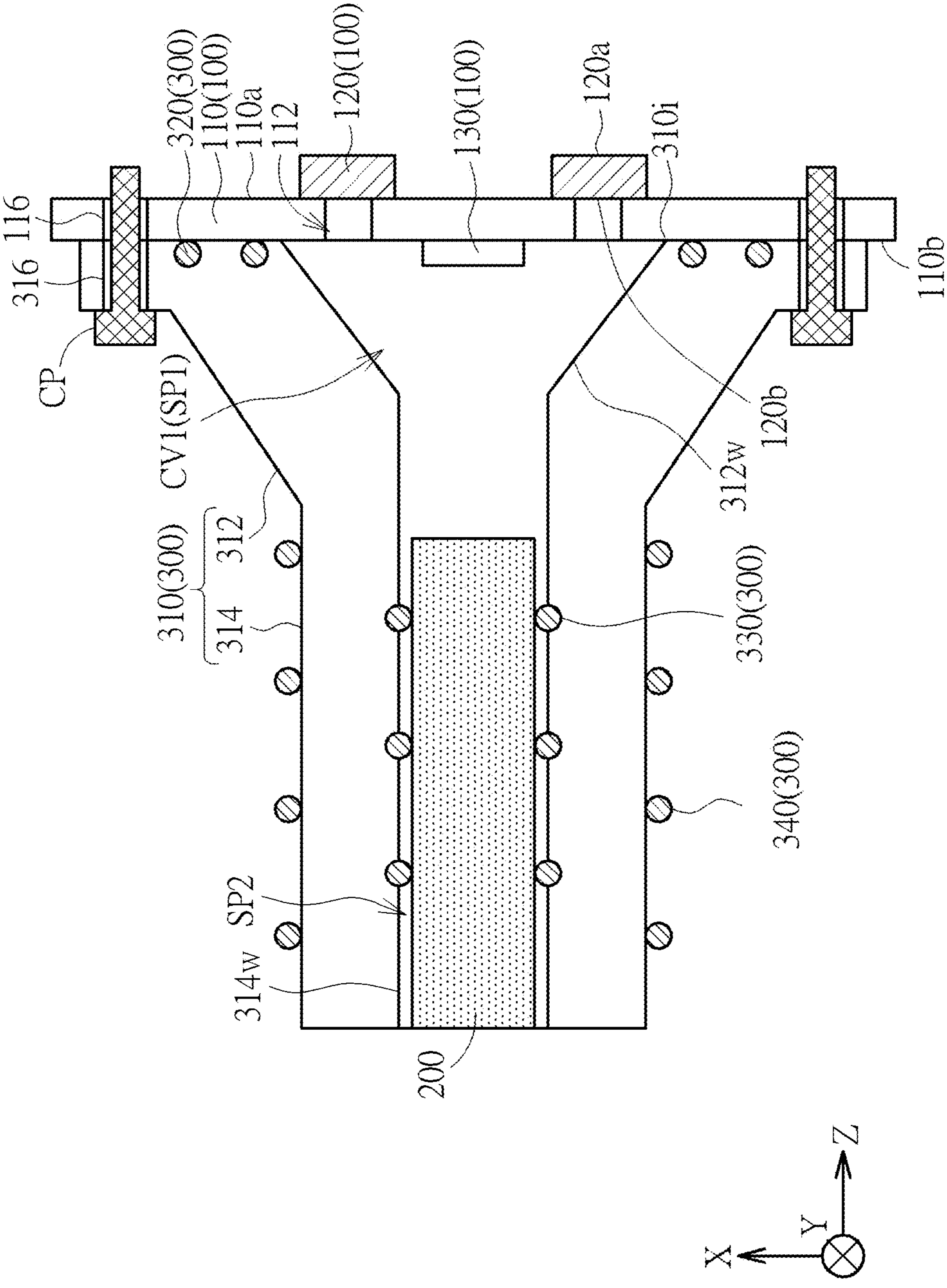
FIG. 3 is a schematic diagram of cross sectional view illustrating a fixture structure, an acoustic sensing component and a testing board according to an embodiment of the present invention.

Referring to FIG. 1 to FIG. 3, FIG. 1 is a schematic diagram illustrating an acoustic testing system with an acoustic testing device according to an embodiment of the present invention, FIG. 2 is a schematic diagram illustrating a fixture structure and an acoustic sensing component according to an embodiment of the present invention, and FIG. 3 is a schematic diagram of cross sectional view illustrating a fixture structure, an acoustic sensing component and a testing board according to an embodiment of the present invention. As shown in FIG. 1 to FIG. 3, an acoustic testing system ATS includes an acoustic testing device AD and at least one signal processing device PD, wherein the signal processing device PD is configured to provide controlling signals to electronic components in the acoustic testing device AD and configured to receive sensing signals for analyzing, so as to obtain the performance of an acoustic wave generated by an acoustic component in the acoustic testing device AD.

As shown in FIG. 1 and FIG. 3, the acoustic testing device AD includes a testing board 100. In FIG. 1 and FIG. 3, the testing board 100 includes a substrate 110, wherein the substrate 110 may be designed based on requirement(s). The substrate 110 may be hard or flexible, wherein the substrate 110 may include silicon, germanium, glass, plastic, quartz, sapphire, metal, polymer (e.g., polyimide (PI), polyethylene terephthalate (PET)), any other suitable material or a combination thereof. As an example, the substrate 110 may be a circuit board including a laminate (e.g., copper clad laminate, CCL), a land grid array (LGA) board or any other suitable board containing conductive material, but not limited thereto. In FIG. 3, a normal direction of the substrate 110 may be parallel to the direction Z.

As shown in FIG. 1 and FIG. 3, the substrate 110 has a first surface 110*a* and a second surface 110*b* opposite to the first surface 110*a*. In FIG. 3, the first surface 110*a* and the second surface 110*b* are opposite to each other in the direction Z. Furthermore, in FIG. 3, the substrate 110 has at least one substrate opening 112 passing through the substrate 110, wherein the shape and the size of the substrate opening 112 may be designed based on requirement(s).

As shown in FIG. 1 and FIG. 3, the testing board 100 of the acoustic testing device AD may have an acoustic component 120 disposed thereon. The acoustic component 120 may be a device under test (DUT). The acoustic component 120 may be disposed on the first surface 110*a* of the substrate 110 and corresponding to the substrate opening 112. In some embodiments, the acoustic component 120 may be a sound producing component.

In some embodiments, the acoustic component 120 has a front side 120*a* and a back side 120*b* opposite to the front side 120*a*, wherein the back side 120*b* faces to the substrate 110. In some embodiments, a first acoustic wave is generated from the front side 120*a* of the acoustic component 120, a second acoustic wave is generated from the back side 120*b* of the acoustic component 120, and the first acoustic wave and the second acoustic wave are simultaneously generated by the acoustic component 120. For example, a phase difference between the first acoustic wave and the second acoustic wave may be 180 degrees, but not limited thereto. Furthermore, the second acoustic wave propagates through the substrate opening 112 of the substrate 110.

In some embodiments, the acoustic component 120 may be driven and controlled by a first controlling signal provided from a signal processing element PDp of the signal processing device PD. For instance, in FIG. 1, the first controlling signal provided from the signal processing element PDp may be transmitted to the acoustic component 120 after passing through an amplifier PDa of the signal processing device PD, but not limited thereto. For example, the signal processing element PDp may be a computer, but not limited thereto.

The acoustic component 120 may include an anchor structure, a membrane anchored by the anchor structure and an actuator configured to actuate the membrane to produce the first acoustic wave and the second acoustic wave. In some embodiments, the anchor structure may be disposed outside the membrane, and the actuator may be disposed on the membrane.

The membrane and the anchor structure may include any suitable material(s). In some embodiments, the membrane and the anchor structure may individually include silicon (e.g., single crystalline silicon or poly-crystalline silicon), silicon compound (e.g., silicon carbide, silicon oxide), germanium, germanium compound, gallium, gallium compound (e.g., gallium nitride or gallium arsenide), stainless steel or a combination thereof, but not limited thereto. In some embodiments, the membrane and the anchor structure may have the same material.

In the operation of the acoustic component 120, the membrane may be actuated to have a movement, and the anchor structure may be immobilized. Namely, the anchor structure may be a fixed end (or fixed edge) respecting the membrane during the operation of the acoustic component 120. In some embodiments, the membrane may be actuated to oscillate along a direction, so as to simultaneously generate the first acoustic wave and the second acoustic wave. For example, the membrane may be actuated to oscillate along the normal direction of the substrate 110 (e.g., in FIG. 3, the membrane moves substantially along the direction Z).

The membrane may be designed based on requirement(s). For example, the membrane may include a plurality of sub-parts and at least one slit, wherein the sub-parts may be divided by the slit, but not limited thereto. Note that the slit has a sufficiently small width to be a narrow slit.

The actuator has a monotonic electromechanical converting function with respect to the movement of the membrane. In some embodiments, the actuator may include a piezoelectric actuator, an electrostatic actuator, a nanoscopic-electrostatic-drive (NED) actuator, an electromagnetic actuator or any other suitable actuator. For example, in an embodiment, the actuator may include a piezoelectric actuator, the piezoelectric actuator may contain such as two electrodes and a piezoelectric material layer (e.g., lead zirconate titanate, PZT) disposed between the electrodes, wherein the piezoelectric material layer may actuate the membrane based on driving signals (e.g., driving voltages and/or driving voltage difference between two electrodes) received by the electrodes, but not limited thereto. For example, in another embodiment, the actuator may include an electromagnetic actuator (such as a planar coil), wherein the electromagnetic actuator may actuate the membrane based on a received driving signals (e.g., driving current) and a magnetic field (i.e. the membrane may be actuated by the electromagnetic force), but not limited thereto. For example, in still another embodiment, the actuator may include an electrostatic actuator (such as conducting plate) or a NED actuator, wherein the electrostatic actuator or the NED actuator may actuate the membrane based on a received driving signals (e.g., driving voltage) and an electrostatic field (i.e. the membrane may be actuated by the electrostatic force), but not limited thereto.

For example, the acoustic component 120 may be a micro electro mechanical system (MEMS) speaker which is a kind of the sound producing component, such that the acoustic component 120 may have a small size and be formed by at least one semiconductor process, but not limited thereto.

In some embodiments, a covering structure may be further included in the testing board 100 of the acoustic testing device AD, wherein the covering structure may be disposed on the first surface 110*a* of the substrate 110 and the acoustic component 120, and the covering structure may cover the acoustic component 120 (i.e., the acoustic component 120 may be disposed between the covering structure and the substrate 110, and the front side 120*a* of the acoustic component 120 may face to the covering structure), thereby protecting the acoustic component 120.

The covering structure may be designed based on requirement(s). In the present invention, the covering structure may be a one-piece structure or be composed of a plurality of sub-structures. The covering structure may include any suitable material, such as metal, glass, silicon, germanium, plastic, polymer or a combination thereof, but not limited thereto. Furthermore, the covering structure may have at least one top opening passing through the covering structure, such that the first acoustic wave may propagate through the top opening of the covering structure.

As shown in FIG. 1 to FIG. 3, the acoustic testing device AD includes an acoustic sensing component 200 configured to sense the second acoustic wave. In some embodiments, the acoustic sensing component 200 may sense the SPL of the second acoustic wave. For example, the acoustic testing device AD may be a microphone, but not limited thereto. In FIG. 1 and FIG. 3, since the acoustic sensing component 200 senses the second acoustic wave, the acoustic sensing component 200 is disposed on the back side 120*b* of the acoustic component 120, and the substrate 110 is disposed between the acoustic sensing component 200 and the acoustic component 120. Namely, the second surface 110*b* of the substrate 110 faces to the acoustic sensing component 200.

In the present invention, since the acoustic sensing component 200 senses the second acoustic wave in different temperatures within a testing temperature range, the acoustic sensing component 200 needs to tolerate this testing temperature range. Namely, an upper bound of an operating temperature of the acoustic sensing component 200 is higher than or equal to a highest temperature in the testing temperature range, and a lower bond of the operating temperature of the acoustic sensing component 200 is less than or equal to a lowest temperature in the testing temperature range. For instance, the upper bound of the operating temperature of the acoustic sensing component 200 may be higher than or equal to 100° C., but not limited thereto.

In some embodiments, the acoustic sensing component 200 may be driven and controlled by a second controlling signal provided from a sensing processing element PDs of the signal processing device PD, and a sensing result sensed by the acoustic sensing component 200 may be transmitted to the signal processing device PD (e.g., the sensing result may be transmitted to the sensing processing element PDs and/or the signal processing element PDp). For instance, the sensing processing element PDs may be a microphone driving module, but not limited thereto.

In order to fix and hold the acoustic sensing component 200 to maintain its position, as shown in FIG. 1 to FIG. 3, the acoustic testing device AD further includes a fixture component 310. In FIG. 1 to FIG. 3, the fixture component 310 is disposed on the second surface 110*b* of the substrate 110, such that the substrate 110 is between the acoustic component 120 and the fixture component 310 and between the acoustic component 120 and the acoustic sensing component 200 fixed by the fixture component 310.

As shown in FIG. 3, the fixture component 310 covers the substrate opening 112 of the substrate 110 when the fixture component 310 is disposed on and connected to the second surface 110*b* of the substrate 110. In FIG. 3, the fixture component 310 has an acoustic inlet 310*i*, and the acoustic inlet 310*i* is corresponding to the substrate opening 112 of the substrate 110 when the fixture component 310 is disposed on and connected to the second surface 110*b* of the substrate 110. Accordingly, the second acoustic wave propagates towards the acoustic sensing component 200 fixed by the fixture component 310 through the acoustic inlet 310*i*.

In FIG. 2 and FIG. 3, the fixture component 310 may include a first part 312 and a second part 314 connected to the first part 312, wherein the first part 312 may include a first inner sidewall 312*w* surrounding a first space SP1, and a second part 314 may include a second inner sidewall 314*w* surrounding a second space SP2 connected to the first space SP1. The first part 312 may have the acoustic inlet 310*i*, wherein the acoustic inlet 310*i* may be defined by the first inner sidewall 312*w* and connected to the first space SP1. The second space SP2 may be configured to accommodate the acoustic sensing component 200, so as to fix and hold the acoustic sensing component 200. Thus, the second acoustic wave propagates towards the acoustic sensing component 200 fixed by the fixture component 310 through the acoustic inlet 310*i*, the first space SP1 and the second space SP2.

In FIG. 3, since the first space SP1 surrounded by the first part 312 of the fixture component 310 and connected to the acoustic inlet 310*i* exists, a first cavity CV1 is formed between the fixture component 310 and the second surface 110*b* of the substrate 110 when the fixture component 310 is disposed on and connected to the second surface 110*b* of the substrate 110. Namely, the first space SP1 surrounded by the first part 312 of the fixture component 310 is changed to the first cavity CV1 when the fixture component 310 is disposed on and connected to the second surface 110*b* of the substrate 110. Note that the first cavity CV1 is an empty space existing between the fixture component 310 and the substrate 110. Note that the first cavity CV1 has a first temperature and a first humidity.

In FIG. 3, the acoustic component 120 is connected to the first cavity CV1 through the substrate opening 112. Therefore, the second acoustic wave generated by the acoustic component 120 propagates in the first cavity CV1 through the substrate opening 112, and the acoustic sensing component 200 senses the second acoustic wave in the first cavity CV1. In some embodiments, as shown in FIG. 3, when the second acoustic wave propagates in the first cavity CV1, a pressure field related to the second acoustic wave is formed, and the acoustic sensing component 200 senses this pressure field. For example, the acoustic sensing component 200 may be a pressure field microphone, thereby increasing the sensing accuracy of the acoustic sensing component 200, but not limited thereto.

The first inner sidewall 312*w* and the second inner sidewall 314*w* of the fixture component 310 may be designed based on requirement(s), so as to make the first space SP1, the second space SP2 and the first cavity CV1 have suitable designs. In FIG. 2 and FIG. 3, an inner cross-sectional size of the second inner sidewall 314*w* may be similar to and/or corresponding to a cross-sectional size of the acoustic sensing component 200, so as to fix and hold the acoustic sensing component 200 well. For instance, the second inner sidewall 314*w* may substantially form the second space SP2 which is cylindrical.

In FIG. 2 and FIG. 3, an inner cross-sectional size of the first inner sidewall 312*w* may be greater than the inner cross-sectional size of the second inner sidewall 314*w*, so as to increase the area of the acoustic inlet 310*i*. For example, in FIG. 2 and FIG. 3, the inner cross-sectional size of the first inner sidewall 312*w* may be gradually narrower from the acoustic inlet 310*i* towards the second inner sidewall 314*w*, such that a cross-sectional size of the first cavity CV1 (i.e., the first space SP1) may be gradually narrower from the acoustic inlet 310*i* (i.e., the substrate 110) towards the acoustic sensing component 200, so as to converge the second acoustic wave, but not limited thereto. For example, in FIG. 2 and FIG. 3, the first cavity CV1 (i.e., the first space SP1) may be similar to a conical shape, but not limited thereto.

The first part 312 and the second part 314 of the fixture component 310 may be designed based on requirement(s). For instance, in FIG. 2 and FIG. 3, a cross-sectional size of the first part 312 may be greater than a cross-sectional size of the second part 314, so as to meet the aforementioned designs of the first inner sidewall 312*w* and the second inner sidewall 314*w*.

In the present invention, the fixture component 310 may be connected to the substrate 110 through any suitable way. As shown in FIG. 3, the fixture component 310 may be connected to the substrate 110 through a plurality of connecting components CP. In detail, the substrate 110 has a plurality of substrate connecting holes 116, the first part 312 of the fixture component 310 may has a plurality of fixture connecting holes 316, and the connecting components CP pass through the substrate connecting holes 116 and the fixture connecting holes 316 for connecting the fixture component 310 and the substrate 110 after the substrate connecting holes 116 and the fixture connecting holes 316 are corresponding to each other. For example, the connecting component CP may be a screw, but not limited thereto. For example, in FIG. 3, the substrate connecting holes 116 may surround the acoustic component 120, and the fixture connecting holes 316 may surround the acoustic inlet 310*i* (i.e., the connecting components CP may surround the acoustic component 120 and the acoustic inlet 310*i*), but not limited thereto.

Moreover, in the condition that the acoustic sensing component 200 senses the pressure field related to the second acoustic wave, this pressure field needs to be maintained well. Thus, the first cavity CV1 may be designed to be or almost be an airtight cavity. For example, the fixture component 310 and the substrate 110 may be connected to each other closely and tightly, so as to enhance the airtight characteristic of the first cavity CV1.

Optionally, the acoustic testing device AD may further include other suitable component to enhance the airtight characteristic of the first cavity CV1. For instance, as shown in FIG. 2 and FIG. 3, the acoustic testing device AD may further include at least one first sealing ring 320 disposed on the first part 312 of the fixture component 310 and surrounding the acoustic inlet 310*i*, wherein the first sealing ring 320 may be disposed between the first part 312 of the fixture component 310 and the substrate 110. For instance, in FIG. 2 and FIG. 3, the acoustic testing device AD may include two first sealing rings 320, but not limited thereto. In FIG. 3, because of the existence of the first sealing ring 320, the possibility of air leaking from the connection between the fixture component 310 and the substrate 110 is reduced, thereby maintaining the pressure field in the first cavity CV1. Therefore, the airtight characteristic of the first cavity CV1 is enhanced.

For instance, the acoustic testing device AD may further include at least one second sealing ring 330 disposed on the second inner sidewall 314*w* of the fixture component 310 and surrounded by the second inner sidewall 314*w* of the fixture component 310, wherein the second sealing ring 330 may surround the second space SP2. In FIG. 2 and FIG. 3, the second sealing ring 330 may be disposed between the fixture component 310 and the acoustic sensing component 200. For instance, in FIG. 2 and FIG. 3, the acoustic testing device AD may include three second sealing rings 330, but not limited thereto. In FIG. 3, because of the existence of the second sealing ring 330, the possibility of air leaking from the second space SP2 is reduced, thereby maintaining the pressure field in the first cavity CV1. Therefore, the airtight characteristic of the first cavity CV1 is enhanced.

Note that the fixture component 310, the first sealing ring 320 and the second sealing ring 330 may form a fixture structure 300. Namely, the fixture structure 300 may use the fixture component 310 to fix and hold the acoustic sensing component 200 and form the first cavity CV1, and the fixture structure 300 may use the first sealing ring 320 and the second sealing ring 330 to maintaining the pressure field in the first cavity CV1.

As shown in FIG. 1, the acoustic testing device AD includes a chamber 400, wherein a second cavity CV2 exists inside the chamber 400, wherein the second cavity CV2 is an empty space inside the chamber 400, and the chamber 400 is a shell of the second cavity CV2. In FIG. 1 and FIG. 3, the substrate 110, the acoustic component 120, at least a portion of the fixture component 310 and at least a portion of the acoustic sensing component 200 are disposed in the chamber 400, wherein the substrate 110 is between the first cavity CV1 and the second cavity CV2, and the front side 120*a* of the acoustic component 120 and the first surface 110*a* of the substrate 110 face to the second cavity CV2. Note that the second cavity CV2 has a second temperature and a second humidity.

In the present invention, the second temperature of the second cavity CV2 may be controlled by any suitable way. In some embodiments, the chamber 400 may include a temperature controlling component 410 configured to control the second temperature of the second cavity CV2. For example, the signal processing device PD (e.g., the signal processing element PDp) may provide a third controlling signal to the temperature controlling component 410, so as to make the temperature controlling component 410 adjust and/or control the second temperature of the second cavity CV2 according to the third controlling signal, but not limited thereto.

Moreover, in the present invention, the second humidity of the second cavity CV2 may be controlled by any suitable way. For example, the second humidity of the second cavity CV2 may be controlled by the signal processing device PD, but not limited thereto.

In the present invention, since the front side 120*a* of the acoustic component 120 faces to the second cavity CV2 of the chamber 400, the temperature of the acoustic component 120 is mainly affected by the second cavity CV2, such that the temperature of the acoustic component 120 may be the same as or similar to the second temperature of the second cavity CV2. On the contrary, if the back side 120*b* of the acoustic component 120 faces to the second cavity CV2 of the chamber 400, the temperature of the acoustic component 120 may not be the same as or not be similar to the second temperature of the second cavity CV2, such that it is difficult to determine the temperature of the acoustic component 120, thereby increasing the testing difficulty.

In the present invention, as shown in FIG. 1 and FIG. 3, since the substrate 110 is between the first cavity CV1 and the second cavity CV2, a temperature difference would exist between the first cavity CV1 and the second cavity CV2 in the testing process. However, because of the heat conduction, the first temperature of the first cavity CV1 is gradually affected by the second temperature of the second cavity CV2. Namely, the first temperature of the first cavity CV1 is gradually increased if the first temperature of the first cavity CV1 is lower than the second temperature of the second cavity CV2, and the first temperature of the first cavity CV1 is gradually decreased if the first temperature of the first cavity CV1 is higher than the second temperature of the second cavity CV2.

Optionally, in order to sense the first temperature of the first cavity CV1 to confirm whether the first temperature of the first cavity CV1 is within the operating temperature of the acoustic sensing component 200, the acoustic testing device AD may include a temperature sensor 130 configured to sense the first temperature of the first cavity CV1. In FIG. 3, the temperature sensor 130 may belong to the testing board 100 and be disposed on the second surface 110*b* of the substrate 110, such that the temperature sensor 130 may be disposed in the first cavity CV1, and the substrate 110 may be between the acoustic component 120 and the temperature sensor 130. In some embodiments, in FIG. 1, a sensing result of the temperature sensor 130 may be transmitted to the signal processing element PDp of the signal processing device PD.

In some embodiments, as shown in FIG. 1, a portion of the fixture component 310 may be disposed outside the chamber 400, so as to make the acoustic sensing component 200 be electrically connected to the sensing processing element PDs of the signal processing device PD. For example, in FIG. 1, a portion of the second part 314 of the fixture component 310 may be disposed outside the chamber 400. Optionally, in FIG. 1, a portion of the acoustic sensing component 200 may be disposed outside the chamber 400, but not limited thereto.

As shown in FIG. 1 to FIG. 3, since a portion of the second part 314 of the fixture component 310 may be disposed outside the chamber 400, the acoustic testing device AD may optionally include at least one third sealing ring 340 surrounding the second part 314 of the fixture component 310, wherein the third sealing ring 340 may be disposed between the second part 314 of the fixture component 310 and the chamber 400. For instance, in FIG. 2 and FIG. 3, the acoustic testing device AD may include four third sealing rings 340, but not limited thereto. In FIG. 1 to FIG. 3, because of the existence of the third sealing ring 340, the possibility of air leaking from the connection between the fixture component 310 and the chamber 400 is reduced, thereby maintaining the temperature of the acoustic testing device AD (i.e., maintaining the second temperature of the second cavity CV2 of the chamber 400). Note that the third sealing ring 340 may also be a component belonging to the fixture structure 300, such that the fixture structure 300 may use the third sealing ring 340 to maintaining the second temperature.

In other words, the acoustic sensing component 200 may sense the second acoustic wave radiated from the back side 120*b* of the acoustic component 120 via the substrate opening 112 while the front side 120*a* of the acoustic component 120 experiences a testing condition. The testing condition may be the second temperature and/or the second humidity maintained within the second cavity CV2.

In the following, the details of an acoustic testing method will be further exemplarily explained.

Figure 4:
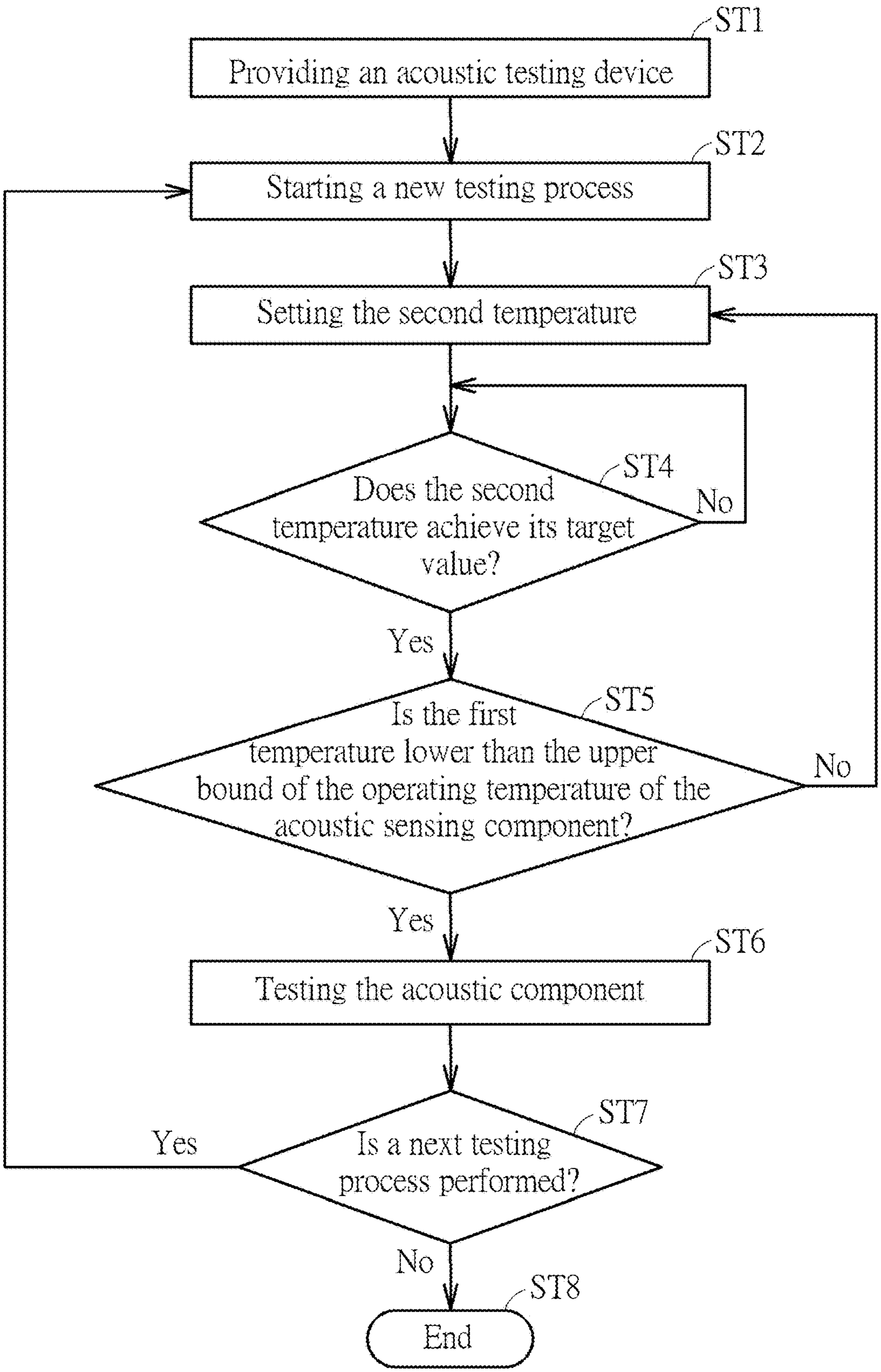
FIG. 4 is a schematic diagram illustrating a flowchart of an acoustic testing method according to an embodiment of the present invention.

Referring to FIG. 4, FIG. 4 is a schematic diagram illustrating a flowchart of an acoustic testing method according to an embodiment of the present invention. It is to be appreciated that the flowchart shown in FIG. 4 is exemplary. In some embodiments, some of the steps may be performed simultaneously, or in a different order than shown in FIG. 4. In some embodiments, before or after one of the existing steps of the acoustic testing method shown in FIG. 4, any other suitable step may be added. Regarding the following contents, the acoustic testing method shall be described with reference to FIG. 4. However, the acoustic testing method is not limited by the following embodiment.

In the step ST1 of FIG. 4, the aforementioned acoustic testing device AD is provided. The acoustic testing device AD is described in the above, and these contents will not be redundantly described.

In the step ST1, at least one of the electronic components in the acoustic testing device AD may be calibrated, so as to enhance the test accuracy of the acoustic testing method. For instance, the acoustic sensing component 200 may be calibrated, so as to increase the sensing accuracy of the acoustic sensing component 200.

In the step ST2 of FIG. 4, a new testing process is started. For instance, a first testing process is started and performed in the following.

In the step ST3 of FIG. 4, the second temperature of the second cavity CV2 of the chamber 400 is set, wherein the temperature setting value is within the testing temperature range of the acoustic testing method. The testing temperature range of the acoustic testing method may be designed based on requirement(s). For example, the testing temperature range may range from −40° C. to 125° C., but not limited thereto. In some embodiments, the signal processing device PD may provide the third controlling signal to the temperature controlling component 410 in the chamber 400, so as to set and control the second temperature of the second cavity CV2 of the chamber 400. For instance, in the first testing process, the second temperature may be set to a first value.

Moreover, in the step ST3, the second humidity of the second cavity CV2 of the chamber 400 may be set also. In some embodiments, the signal processing device PD may set and control the second humidity of the second cavity CV2 of the chamber 400.

In the step ST4 of FIG. 4, the second temperature of the second cavity CV2 of the chamber 400 is sensed, so as to determine whether the second temperature reaches its target value. In some embodiments, the temperature controlling component 410 in the chamber 400 may sense the second temperature of the second cavity CV2 of the chamber 400. For instance, in the first testing process, the second temperature of the second cavity CV2 of the chamber 400 is sensed, so as to determine whether the second temperature reaches the first value.

If the second temperature does not reach its target value, the step ST4 is performed again to determine the second temperature again. If the second temperature reaches its target value, a next step (e.g., the step ST5) is performed.

Moreover, in the step ST4, the second humidity of the second cavity CV2 of the chamber 400 may be sensed also, so as to determine whether the second humidity reaches its target value. If the second humidity does not reach its target value, the step ST4 is performed again to determine the second humidity again. If the second humidity reaches its target value, a next step (e.g., the step ST5) is performed.

In the step ST5 of FIG. 4, the first temperature of the first cavity CV1 is sensed, so as to determine whether the first temperature is lower than the upper bound of the operating temperature of the acoustic sensing component 200. In some embodiments, the first temperature is sensed by the temperature sensor 130.

If the first temperature is not lower than the upper bound of the operating temperature of the acoustic sensing component 200, the step ST3 is performed again to reset the second temperature. If the second temperature is lower than the upper bound of the operating temperature of the acoustic sensing component 200, a next step (e.g., the step ST6) is performed.

In the step ST6 of FIG. 4, the acoustic component 120 is tested, wherein the acoustic component 120 is driven to generate the first acoustic wave on the front side 120*a* and to generate the second acoustic wave on the back side 120*b*, the second acoustic wave is sensed by the acoustic sensing component 200 to obtain a sensing result, and the sensing result is transmitted to the signal processing element PDp of the signal processing device PD for suitably processing (e.g., calculating).

For instance, in the first testing process, the second acoustic wave is sensed by the acoustic sensing component 200 to obtain a first result. Namely, the acoustic wave is sensed by the acoustic sensing component 200 to obtain the first result after the second temperature of the second cavity CV2 is adjusted to reach the first value.

After the acoustic component 120 is tested, this testing process is ended.

In the step ST7 of FIG. 4, it needs to determine whether a next testing process is performed or not. If the next testing process is performed, the step ST2 is performed again to perform the next testing process. For instance, a second testing process is performed, wherein the second acoustic wave is sensed by the acoustic sensing component 200 to obtain a second result after the second temperature of the second cavity CV2 is adjusted to reach a second value different from the first value. Note that the first testing process and the second testing process are performed iteratively and/or continuously.

If the next testing process is not performed, the acoustic testing method is ended (i.e., the step ST8). For instance, the acoustic testing method is ended after the acoustic component 120 is tested completely over the testing temperature range, but not limited thereto.

In the present invention, the acoustic testing method is capable of dynamically testing the acoustic component 120 in different temperatures within the testing temperature range.

By performing the acoustic testing method, the performances of the acoustic component 120 in different temperatures are obtained. Namely, the relation between the performance of the acoustic component 120 and the temperature is tested and obtained. For instance, if a shift of the SPL of the second acoustic wave exists and/or a shift of the total harmonic distortion (THD) of the second acoustic wave exists when the temperature of the acoustic component 120 is changed, these shifts are sensed and tested to be obtained by the acoustic testing device AD and the acoustic testing method.

In the testing process of the present invention, one acoustic component 120 or a plurality of acoustic components 120 may be tested. The acoustic components 120 may be simultaneously tested or respectively tested. Also, the number of the acoustic sensing component(s) 200 may be designed based on the testing requirement(s).

In summary, the performances of the acoustic component in different temperatures are obtained by the acoustic testing device and the acoustic testing method of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acoustic testing device, comprising:

a substrate having a first surface and a second surface opposite to the first surface, wherein the substrate has a substrate opening;

an acoustic component disposed on the first surface of the substrate and corresponding to the substrate opening;

a fixture component disposed on the second surface of the substrate, wherein a first cavity is formed between the fixture component and the substrate; and an acoustic sensing component fixed by the fixture component;

wherein the substrate is between the acoustic component and the fixture component;

wherein a first side of the acoustic component faces a second cavity and experiences a testing condition maintained within the second cavity;

wherein the acoustic sensing component is configured to sense an acoustic wave radiated from a second side of the acoustic component via the substrate opening while the first side of the acoustic component experiences the testing condition;

wherein the testing condition comprises a temperature or a humidity maintained within the second cavity.

2. The acoustic testing device of claim 1, further comprising a first sealing ring disposed between the fixture component and the substrate, wherein the first sealing ring is configured to maintain a pressure field within the first cavity.

3. The acoustic testing device of claim 1, further comprising a second sealing ring disposed between the fixture component and the acoustic sensing component, wherein the second sealing ring is configured to maintain a pressure field within the first cavity.

4. The acoustic testing device of claim 1, further comprising a third sealing ring surrounding the fixture component, wherein the third sealing ring is configured to maintain a temperature of the acoustic testing device.

5. The acoustic testing device of claim 1, wherein a cross-sectional size of the first cavity is gradually narrower from the substrate towards the acoustic sensing component.

6. The acoustic testing device of claim 1, wherein an upper bound of an operating temperature of the acoustic sensing component is higher than or equal to 100° C.

7. The acoustic testing device of claim 1, wherein the acoustic sensing component is a pressure field microphone.

8. The acoustic testing device of claim 1, further comprising:

a chamber, wherein the second cavity exists inside the chamber;

wherein the acoustic component is disposed in the chamber, and the substrate is between the first cavity and the second cavity.

9. The acoustic testing device of claim 8, wherein the chamber comprises a temperature controlling component configured to control the temperature of the second cavity.

10. The acoustic testing device of claim 1, further comprising a temperature sensor disposed on the second surface of the substrate, wherein the substrate is between the acoustic component and the temperature sensor.

11. The acoustic testing device of claim 1, wherein a fixture structure comprises the fixture component, and the fixture component comprises:

a first part comprising a first inner sidewall surrounding a first space, wherein the first part has an acoustic inlet defined by the first inner sidewall and connected to the first space; and a second part connected to the first part and comprising a second inner sidewall surrounding a second space connected to the first space, wherein the second space is configured to accommodate the acoustic sensing component;

wherein the fixture structure is configured to hold the acoustic sensing component.

12. The acoustic testing device of claim 11, wherein an inner cross-sectional size of the first inner sidewall is greater than an inner cross-sectional size of the second inner sidewall, and the inner cross-sectional size of the first inner sidewall is gradually narrower from the acoustic inlet towards the second inner sidewall.

13. The acoustic testing device of claim 11, wherein a cross-sectional size of the first part is greater than a cross-sectional size of the second part.

14. The acoustic testing device of claim 11, wherein the fixture structure further comprises a first sealing ring disposed on the first part of the fixture component and surrounding the acoustic inlet.

15. The acoustic testing device of claim 11, wherein the fixture structure further comprises a second sealing ring disposed on the second inner sidewall and surrounded by the second inner sidewall.

16. The acoustic testing device of claim 11, wherein the fixture structure further comprises a third sealing ring surrounding the second part of the fixture component.

17. A testing board, comprising:

a substrate having a first surface and a second surface opposite to the first surface, wherein the substrate has a substrate opening;

wherein an acoustic component is disposed or to be disposed on the first surface of the substrate and corresponding to the substrate opening;

wherein the second surface faces to an acoustic sensing component, and the acoustic sensing component is configured to sense an acoustic wave radiated from a first side of the acoustic component via the substrate opening while a second side of the acoustic component experiences a testing condition;

wherein the second side of the acoustic component faces a cavity, and the testing condition comprises a temperature or a humidity maintained within the cavity.

18. The testing board of claim 17, further comprising a temperature sensor disposed on the second surface of the substrate, wherein the substrate is between the acoustic component and the temperature sensor.

19. The testing board of claim 17, wherein the acoustic component is a micro electro mechanical system (MEMS) speaker.

20. An acoustic testing method, comprising:

providing an acoustic testing device, wherein the acoustic testing device comprises:

a substrate having a first surface and a second surface opposite to the first surface, wherein the substrate has a substrate opening;

an acoustic component disposed on the first surface of the substrate and corresponding to the substrate opening;

a fixture component disposed on the second surface of the substrate, wherein a first cavity is formed between the fixture component and the substrate;

an acoustic sensing component fixed by the fixture component; and a chamber, wherein a second cavity exists inside the chamber, the substrate, the acoustic component, the fixture component and the acoustic sensing component are disposed in the chamber, and the substrate is between the first cavity and the second cavity;

wherein a first side of the acoustic component faces the second cavity and experiences a testing condition maintained within the second cavity;

wherein the acoustic sensing component is configured to sense an acoustic wave radiated from a second side of the acoustic component via the substrate opening while the first side of the acoustic component experiences the testing condition;

performing a first testing process, wherein the acoustic wave is sensed by the acoustic sensing component to obtain a first result after a temperature of the second cavity is adjusted to reach a first value; and performing a second testing process, wherein the acoustic wave is sensed by the acoustic sensing component to obtain a second result after the temperature of the second cavity is adjusted to reach a second value different from the first value;

wherein the first testing process and the second testing process are performed iteratively.

21. An acoustic testing method, comprising:

providing a cavity within which a testing condition is maintained;

disposing an acoustic component on a first surface of a substrate, wherein a substrate opening is formed on the substrate, a first side of the acoustic component faces the cavity and experiences the testing condition maintained within the cavity;

disposing a fixture component on a second surface of the substrate, wherein an acoustic sensing component is fixed within the fixture component; and sensing, by the acoustic sensing component, an acoustic wave radiated from a second side of the acoustic component via the substrate opening;

wherein the testing condition comprises a temperature or a humidity maintained within the cavity.

* * * * *